United States Patent [19]
Bernier

[11] 3,723,904
[45] Mar. 27, 1973

[54] FILM MOUNT AND MASK FOR A PAIR OF PANORAMIC STEREOSCOPIC IMAGES

[75] Inventor: Robert V. Bernier, Saugus, Calif.
[73] Assignee: TRW Inc., Cleveland, Ohio
[22] Filed: Oct. 13, 1971
[21] Appl. No.: 188,896

[52] U.S. Cl. ................................................. 40/152
[51] Int. Cl. ............................................... G09f 1/12
[58] Field of Search ....40/10, 152, 158, 158 B, 63 A, 40/64 A; 350/135

[56] References Cited
UNITED STATES PATENTS

| | | | |
|---|---|---|---|
| 2,803,077 | 8/1957 | Baireuther | 40/152 |
| 2,968,108 | 1/1961 | Knox | 40/152 |
| 2,971,282 | 2/1961 | Petrey | 40/152 |
| 3,424,511 | 1/1968 | Ratliff | 350/135 |
| 3,649,099 | 3/1972 | Furuoka | 350/135 |

Primary Examiner—Robert W. Michell
Assistant Examiner—Wenceslao J. Contreras
Attorney—Milton E. Gilbert

[57] ABSTRACT

A film mount and mask for a panoramic stereoscopic camera in which processed film strip has stereoscopic pairs of film frames cut and mounted in a holder providing a mask for each frame and means comprising a boss provided for each film frame in the mount to register with a notch in the film for positioning purposes, and to prevent the film frame from moving towards either extremity when heated in a projector, each film frame being held in a cylindrical plane by means of a mask, with means formed into the mount to accept either clips, or plastic feet in the case of a plastic mask, to secure the film frames tight against the curved focal plane formed in the mount, said plane being identical as to focal radius with the curved film bed in the panoramic stereoscopic camera in which the film was exposed.

10 Claims, 17 Drawing Figures

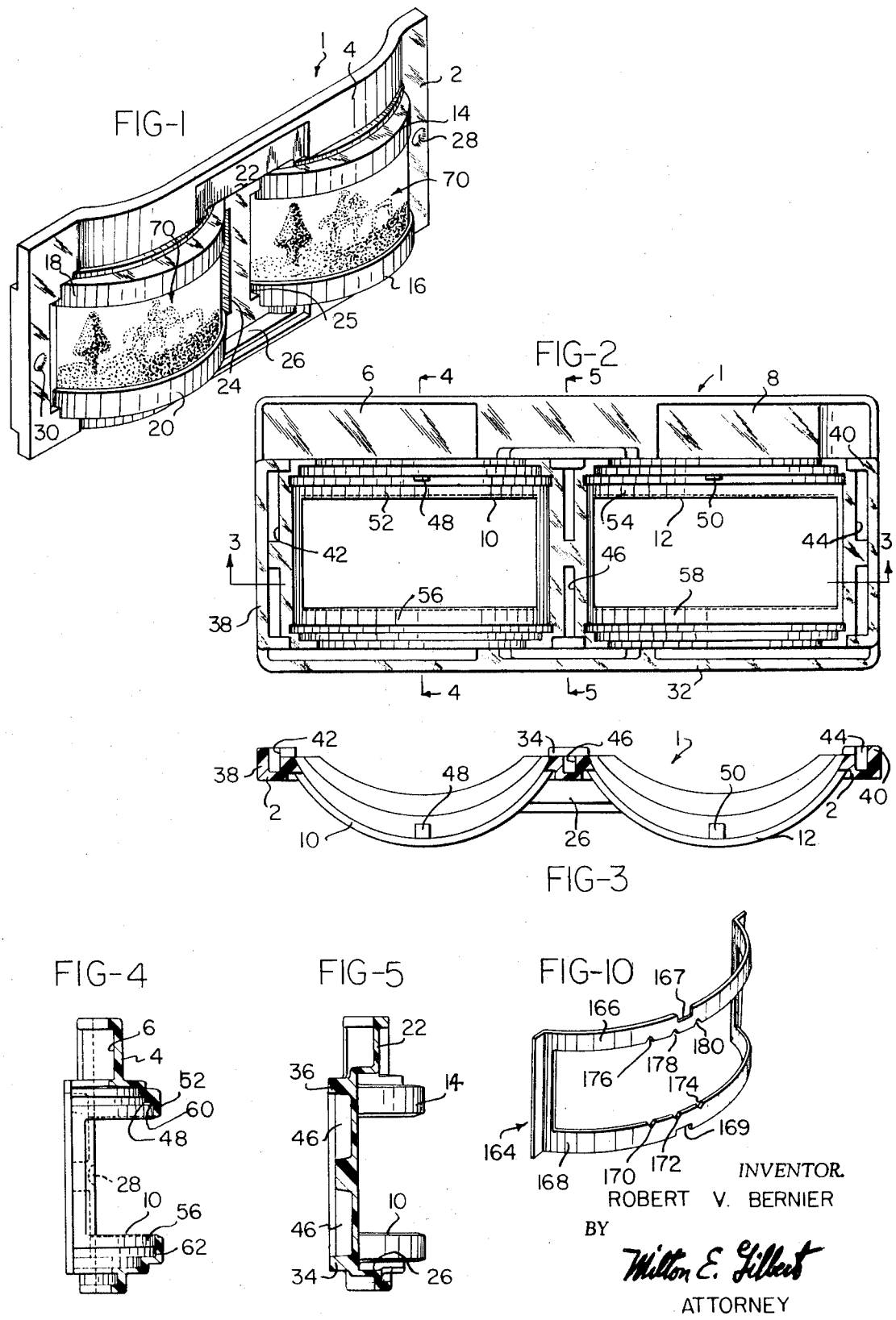

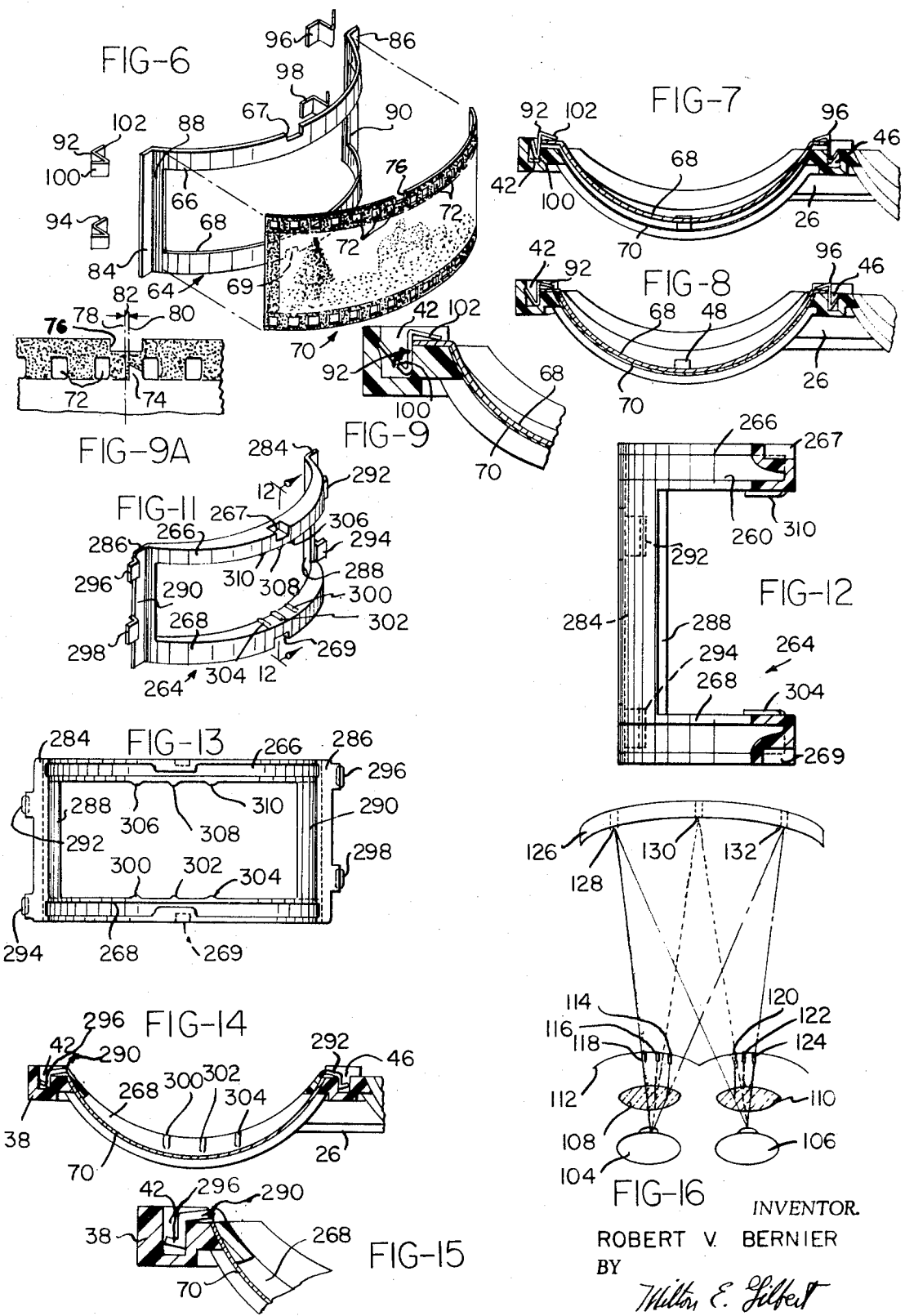

FILM MOUNT AND MASK FOR A PAIR OF PANORAMIC STEREOSCOPIC IMAGES

STATE OF PRIOR ART

Stereoscopic film holders or slides have been generally known in which the individual frames are held flat in a flat piece of cardboard, or between two pieces of flat glass. It has been suggested, for use with a stereoscope, to drop the film directly into frames in the back end of the stereoscope which are slightly curved, but not stereoscopic or panoramic. Such rather flat curve provides a pseudoscopic effect. Such device also uses a continuous film strip with clamps or fingers to fix the frames in position.

DRAWINGS

FIG. 1 is a perspective view of the film mount of the invention showing two panoramic stereoscopic film frames mounted and registered into position;

FIG. 2 is a rear view of the film mount of the invention shown in FIG. 1;

FIG. 3 is a cross-sectional view taken along line 3—3 of FIG. 2;

FIG. 4 is a cross-sectional view taken along line 4—4 of FIG. 2;

FIG. 5 is a cross-sectional view taken along line 5—5 of FIG. 2;

FIG. 6 is a perspective view of a film frame and mask;

FIGS. 7, 8 and 9 are partial cross-sectional views through a film mount showing the assembly of a mask and film frame therein;

FIG. 9a is a detail of the sprocket hole structure of the film strip.

FIG. 10 is a perspective view of the mask of FIG. 6, slightly modified;

FIG. 11 is a perspective view of a modified mask;

FIg. 12 is a side view of the mask of FIG. 11 with a partial cross-section taken along the plane passing through ribs 310 and 304;

FIG. 13 is a rear view of the mask of FIG. 11;

FIGS. 14 and 15 are partial cross-sectional views through a film mount showing the assembly of the mask of FIG. 11 therein; and FIG. 16 is a schematic representation of operational aspects of the film mount of the invention.

DETAILED DESCRIPTION OF INVENTION

The film mount is generally shown in FIG. 1, and comprises a body 2, preferably made of plastic, and having an upwardly extending surface 4 to enable handling without touching the frames. Indented areas 6 and 8 are provided on the back of the surface 4 (see FIG. 2) to which may be affixed identification labels if desired.

A pair of window openings 10, and 12, are provided to receive the left and right, respectively, film frames of a stereo pair or pair of stereo images. The curvature of the window portions (see especially FIG. 3) 10,12 are made identical, as to focal radius, with the curved film bed of the panoramic stereoscopic camera in which the exposures were made. For this purpose the curved seats 14 and 16 (see FIG. 1) are formed above and below the window opening 10, for example, and the similar curved seats 18 and 20 are provided for the window 12. Recess 22 is formed as a flat surface to serve as a means for checking on the uniformity of cross-section of the plastic thickness. Additionally, the recessed area 22 is in the nature of a "step" down from the surface 4, and together with the further "step" 24 preventing occulating of the line of sight in the "inner" areas of the film. The latter would occur when viewing the extremities of the film if a protruding portion of the mount were seen. Similar stepped portions are provided (not numbered) on the rear of the body 2 to permit nesting of a plurality of the mounts 1. Steps 26 are provided on the front of the mount also for nesting alignment.

The front of the mount is provided with the "dimpled" areas 28 and 30 which register with a retaining means in a stereoscopic panoramic viewer (e.g. springs) to hold the film mount in position within the viewer. The mount is thus accurately registered and is held by a means bearing against one side of the mount.

The central portion of the body 2 is provided at the rear with upper, 36, and lower, 34, positioning ledges (see especially FIG. 5). On the left side at the rear of the body 2 (as viewed in FIG. 2), there is provided a continuous U-shaped ledge 38, and at the right side at the rear of the body 2 there is provided the similar ledge 40. The bottom portion of these ledges align the mount in correct horizontal position, and the face of each of these ledges serves to align the mount vertically in a vertical plane, they fit up against the vertical faces or surfaces of the mount holder in the panoramic viewer. As shown more clearly in FIG. 3, the ledges 38 and 40 are formed in a re-entrant manner, i.e. are spaced from the main portion of the body 2 to form the channels or grooves 42 and 44, respectively. A groove 46 is formed in the central portion of the body 2 as shown in FIG. 5. These grooves 42, 44 and 46 serve to accommodate film mask retaining clips which are discussed hereinafter.

The upper seat 14 of the window 10 has formed thereon a depending boss 48, and the upper seat 18 of the window 12 similarly has formed thereon the depending boss 50, both bosses being otherwise identical. These bosses are used to register with notches which have been previously cut into the film, and also with similar notches formed in the film mask described hereinafter. As shown clearly in FIG. 4 the upper part of the rail 14 is recessed so that the film is permitted to lie flat against the rail. The reason for such recessing is apparent from a consideration of the molding process, wherein the plastic may be formed with a protruding "radius" at the top and bottom, respectively, of the upper and lower seats, so as to prevent the film frame from lying flat against the desired surface (i.e. it might be pressed outwardly by a radius). This construction results in the formation of the upper rails 52 and 54, and lower rails 56 and 58 (see FIGS. 2 and 4) against which the film frame will be seated. These rails are also undercut, as shown at 60, with respect to rail 52; and as shown at 62, with respect to rail 56. These undercuts serve to eliminate radiuses that might otherwise occur in the molding of the plastic at the top edge and the bottom edge of the film recess. The film is thus permitted to lie flat against the rails.

Turning now to FIG. 6 there is explained the means for positioning the previously cut film frame strips on the rails and their retention in position by a resilient member, which could be plastic or metallic. Such a resilient member is shown generally as 64, and could be of spring material and is of a curved configuration, of a radius le s s than that into which it will be constrained after assembly or installation into the mount.

The constraint is provided by the use of clips for retention which serves to apply pressure to the film at its central area since the resilient member or frame member such as 64 tends to straighten out, and in attempting to do so it bears more strongly upon the central area of the film.

Unless the pair of stereo images or film frames are mounted at the correct distance apart from one another, and are properly masked, satisfactory relief effects cannot be obtained. Therefore, with respect to the mask, and in order to obtain correct three dimensional viewing, it is necessary to fix a reference plane such that all objects from infinity to the closest object will appear in their correct spatial relationship to such reference plane. It is desired that this reference plane should bear the same relationship to the objects in the photograph that an open window or veranda bears to the scene beyond. Thus, the stereo effect on a panoramic basis is best obtained if the images are so mounted that, when viewed, the observer appears to be looking through a veranda at the three dimensional objects comprising the scene. The frame or marginal edges of the openings in the left eye and right eye masks should have their corresponding vertical edges at a distance apart slightly less than 65 mm (the interaxial distance of the lenses in a preferred form of panoramic viewer, as well as the average interpupilary distance of the eyes). This distance, in a quantitative sense, should be less than the distance apart (in the two stereoscopic images) of close-up images. In this manner can the closeup objects spatially appear beyond the masked opening.

When the film frames are mounted in the film mount means are provided for insuring that the film frames are mounted at a distance apart which is approximately the same as when they were when taken in the camera, i.e. identical infinity image points on the two stereo film frames are located at a distance apart which is equal to the interaxial distance of the viewer lenses as well as what would be the average interpupilary distance. Thus, when viewing the mounted stereo film pairs, the sight lines of the eyes must diverge to a parallel condition to fuse on infinity images. This condition of the eyes tells the brain that the object being looked at is in fact at infinity. Once the film frames are correctly mounted so that infinity objects are made to appear at infinity, as described above, all other objects photographed at lesser disances from the camera will also appear, when viewed, at their proper distances. This is so because the camera lenses will have automatically caused the respective disparate images of objects at different distances to be displaced towards each other on the film an amount directly proportional to the various distances to the objects. When viewing the mounted frames the eyes will need to converge to fuse on the different sets of disparate images. The amount of this convergence gives the brain the data it needs to cause objects to appear, when viewed, in space at their correct relative distances. Correct positioning of the film frames in the mount is accomplished by placing a registration notch in the film strip 70 which is centered on the central axis of the film frame image. It is noted that the central axis of the film frame image does not always fall exactly between perforations. As shown in FIGS. 6 and 9A, the film strip 70 is provided with the normal sprocket perforations 72 at its upper and lower edges. Along the upper edge of the strip 70 is placed a fiducial mark 74, which desireably is placed there during the exposure of the film in the camera. The vertical edge 78 of the fiducial mark 74 indicates the exact central axis of the film frame image and is aligned when previously cutting the notch 76, so that the center line of the notch 82 also falls at the exact central axis of the film frame image. The slanting leg 80 of the fiducial mark 74 indicates whether the film frame image on which it appears is a right eye or a left eye image. As shown in FIG. 9A the slanting leg 80 of the fiducial mark 74 slants away from the vertical leg 78 to the right. Thus this would indicate that this particular film frame image would be a right eye image and should be mounted in the right hand side of the film mount. When reading the direction of slant of the fiducial mark the film strip should be held with the emulsion side of the film facing away from the eyes, and/or the film strip should be held such that the film image appears to agree with the subject matter photographed left for right and top for bottom.

As mentioned hereinbefore, the mount of the invention is so constructed as to provide a reference plane formed visually as a spatial window. This is brought about by providing for an opening in each film mask which is displaced inwardly towards the center of the mount by an amount a little greater than the inward displacement which the eyes must accommodate in viewing close-up objects. A shown in FIG. 6 the resilient member, frame or mask 64 is provided with upper 66, and lower 68, rails which are provided with notches 67 and 69 on their respective outer edges. For accomplishing the purposes abovementioned only one notch need be provided, however, it is to be understood that it is desireable to interchange and reuse the masks with different film frames, and thus the mask 64 could be inverted for use on the opposite side of the mount 1. One of the notches (whichever one is oriented at the top) 67, 69 engages either the boss 48 or 50 as discussed hereinafter. Such registration of notch and boss serves to retain the mask 64 in fixed position within the window 10 or 12, upon assembly therein. The two windows 10, 12 are displaced inwardly towards the center of the mount with respect to the mount centerline. This is accomplished by making the outer side of the mask wider than the inner side, thus shifting the actual center line of the window opening when the mask is mounted therein. With a pair of masks containing film frames of a stereo pair mounted in the mount 1, the wider edges of the masks are on the outside of the mount and the narrower edges of the masks are located towards the center of the mount. This serves to displace the window opening of each mask inwardly with respect to the images on each of the film frames. As shown in FIG. 6, in addition to the upper and lower rails, the mask 64 is provided with side rails. The left oriented side rail as viewed in FIG. 6 is formed with the curved portion 88 (which is a continuation of the curvature of the upper and lower rails) and a bent over straight portion or flange 84. The right oriented side rail is similarly formed with the curved portion 90 and the flange 86. Although not clearly shown in FIG. 6, it is intended that the left rail be wider than the right rail of the mask 64.

In order to affix and retain the mask and film strip in the mount, a series of clips 92, 94, 96 and 98 are provided. These clips are identically formed and clip 92 is described hereinafter, it being understood that the other clips have identical features. Clip 92 is formed with the bent-over V-shaped spring portion 100 and a straight portion 102. The positioning of the parts upon assembly is more clearly shown in FIG. 9, wherein the clip 92 is shown as snapped into position into the channel 42, with the spring portion 100 bearing the inner surface of the ledge 38 and slightly gauging or displacing it for better frictional retention. The flange 84 of the mask 64 is retained in position by the clip portion 102 bearing against it and seating it against the body 2. As shown in FIGS. 7 and 8, the mask 64 is held at its other side by the clip 96, which snaps into the channel 46, FIG. 7 showing the clips only placed into the channels, and FIG. 8 showing the clips pushed fully into place. In this manner the film frame is brought into close contact and retained against the rails 66 and 68, especially at the central portion thereof so that when viewed in a viewer (and thus subjected to the heat of an illuminating source) the film will not buckle away from the rails.

Some of the theoretical considerations discussed above can be more readily understood with reference to FIG. 16, which is a schematic representation of the spatial effects created by the mount of the invention when placed into a viewer. An image of a window, permitting a true three dimensional viewing, is created by means of a reference point. The vertical edges of the scene appearing on the stereo film image pair are not seen always since in a viewer one would have to try to look "around corners" to view such edges. Without vertical edges within the field of view, other reference points must be provided, and these are accomplished by the use of novel ribs or notches on the mask. As shown in FIG. 16, the human eyes are represented as 104 and 106, with the lines of sight passing through the lenses 108 and 110, respectively, and through the plane 112 of the film frames (the doubly curved plane when the two masks are properly mounted in the mount). As is well understood, the lenses of the viewer serve to aid the eyes to come to a focus on the relatively close proximity (to the eyes) of the film plane and mask 112. The latter serves as the plane of a window opening. In order to obtain a correct three dimensional viewing of the window in the masks, a spatial window image must appear out in front of the actual position of the mask, i.e. between the eyes or viewing point and the closest spatial object in the three dimensional scene. To accomplish this there is provided by the invention a series of notches or embossed ribs in the window frame opening, represented in FIG. 16 by the reference numerals 114, 116 and 118 for the left eye and 120, 122 and 124 for the right eye. To obtain the sense of depth, the mask window will appear to the observer as being located approximately 3 to 4 feet in front of the film plane, because the rays from the eyes as they focus on various points of the stereo image are made to focus on the ribs or notches also, (since the latter are in relatively the same plane as the film image) and such rays will spatially converge to form a vision in the brain looking like an actual window in space, represented as 126 in FIG. 16. Thus, the rays passing through the left and right image ribs 118 and 120 will be made to converge at 128 at the window in space 126; the rays passing along ribs 116 and 122 will converge at 130 and the rays passing along ribs 118 and 124 will converge at 132. These ribs or notches serve to provide definite points for the eyes to triangulate upon where otherwise there would be nothing but an unbroken horizontal line. Thus, the opportunity for the eyes to triangulate on points provided by the ribs or notches in the relative center of the rather wide window leaves no error in the data which the brain is provided. Therefore, there is no confusion and the brain causes the vision of the window to appear in space correctly at 126, where it is intended that it should appear.

Since, in the case of thin metallic film masks such as 64 (discussed in connection with FIGS. 6, 7, 8, 9 and 9a) there would be no surface upon which to provide a series of ribs, notches would be used to provide the effect just discussed. The application of notches to such a film mask is shown in FIG. 10 wherein a film mask 164, having the upper 116 and lower 168 rails, and the upper 167 and lower 169 notches, is provided further with the series of notches 176, 178 and 180 on the lower edge of rail 166, and the series of notches 170, 172 and 174 on the upper edge of the lower rail 168. The two series of approximately V-shaped notches are symmetrically located with respect to the window opening and as shown in FIG. 13, for example, are displaced to the left with respect to the mask center line. The mask shown in FIG. 13 would serve for viewing the right hand image of the stereo pair since the ribs are displaced to the left. If used in inverted orientation then the mask of FIG. 13 would have the ribs being displaced to the right of the physical center of the mask, and in that position the mask would then serve to hold the left hand image of the stereo pair.

Instead of a thin metallic mask a plastic mask may be provided, as shown in FIGS. 11 through 15, inclusive. The mask 264 is formed with a relatively thicker upper 266 and lower 268 rails and the side flanges 284 and 286. The upper edge of the upper rail 266 is provided with the notch 267, and the lower edge of the lower rail 268 is provided with the notch 269. In connection with the prior showing of the metal masks 64 and 164 the notches at the outer edges of the rails extended completely through the thickness of the mask, because of the thin metal element. However, the use of plastic permits a thicker mask and the notches 267 and 269 do not go entirely through the thickness of the mask. This is desireable since in this manner the notches are hidden from the observer. Because of their central location, the parallel rays from the eyes of the observer would tend to converge at a point of infinity, thus causing confusion, if the notches or recesses were visable; the confusion arising because the use of the ribs or notches on the inner surfaces of the rails would tend to cause the axis of the eyes to converge at a point only several feet in front of the observer.

As shown in FIG. 13, the side flange 284 has a relatively narrower side rail 288 as compared with the side rail 290 of the side flange 286. Formed on the flange 288 are a pair of legs or feet 292 and 294; and similarly formed on the flange 286 are the legs or feet 296 and 298. The legs 292 and 294 are so oriented with respect to the legs 296 and 298 that when inverted they will be presented in the same configuration to permit interchangeability of the mask from the right to the left side of the mount, and to especially provide that the legs on the right side of the left mask, and the left side of the right mask, do not interfere with each other when pressed into the common slot 46 in the center of the mount. The side flanges 284 and 286, together with the legs 292, 296 and 298 serve the same function as the clips 92, 94, 96 and 98 described in connection with mask 64. As shown in FIG. 14, the mask 264 is merely placed into the mount 1, with the flange 190 resting against the body 2 and the leg 296 extending into the channel 42; and the leg 292 extends into the channel 46. Upon further assembly as shown in FIG. 15 the leg 296 is seated into the channel 42 with its outer portion bearing against the inner wall of the ledge 38.

A series of ribs 300, 302 304 are provided on the upper edge of the lower rail 268; and a series of ribs, directly oppositely oriented, 306, 308 and 310 are provided on the lower edge of the upper rail for the purposes above described.

By placing the legs of the plastic mount, or the corresponding portions of the clips in the case of the metal mount, into the channels 42, 44 and 46 of the mount body 2, clearance is provided so that the alignment of the mount in the viewer is not determined by any portion of the mask, but by the mount alone.

Although what has been described has been specific construction of preferred embodiments of the invention, it is to be understood that various modifications and rearrangements of parts can be provided while still remaining within the spirit and scope of the appended claims.

What I claim is:

1. A film mount for a pair of panoramic stereoscopic images, comprising, in combination:
   a body member;
   said body member being provided with pairs of curved seats having a degree of curvature substantially corresponding to the focal radius of a curved film bed upon which film is exposed to provide a pair of panoramic stereoscopic images;
   a pair of window openings in said body member formed in part by said pairs of curved seats;
   and a pair of mask members provided with openings and adapted to be mounted within said window openings in said body member for holding and positioning a pair of film frames bearing coordinate panoramic stereoscopic images, so that said images are viewable through said mask members openings.

2. The film mount of claim 1 wherein said body member and mask members are provided with positively cooperating means for both vertical and horizontal alignment of the mask members within said body member.

3. The film mount of claim 2 including stereo image film frame strips, one for each mask member, and means on said film frame strips cooperating with said positively cooperating means to position said strips upon their assembly with said mask members into said body members in such manner that corresponding infinity image points on said stereo film frames are located at a distance apart which is equal to the average interpupilary distance of the human eyes.

4. The film mount of claim 3 wherein said mask members are formed with means providing a plurality of reference points which are visible in the openings therein, said means being so arranged as to cause an observer looking through said stereo image film strips to focus his eyes on said reference points at the same time that he views said images whereby the brain will have no difficulty in causing to be formed a vision of this opening located in space beyond the viewpoint but in front of the closest spatial object appearing on the stereo image film frame strips.

5. The film mount of claim 2 wherein said mask members are so constructed that said positively cooperating means are not visible to the observer when viewing through the assembled film mount and mask members.

6. The film mount of claim 1 wherein said mask members are provided with means for assuring retention thereof within the body member, said latter means including a resilient element for simultaneously and fixedly assembling and retaining in position a film strip and a mask member within said body.

7. The film mount of claim 6 wherein said body member is provided with a plurality of recesses, and said resilient means includes members so constructed and arranged as to enter into said recesses and frictionally engage a portion of walls thereof.

8. The film mount of claim 6 wherein said mask members are formed with curved rails having a radius of curvature somewhat less than that into which they will be constrained upon installation into the mount, whereby following such installation pressure will be thereby applied to the film strips at the central area of their edges.

9. The film mount of claim 1 including means on said mask members which are so constructed and arranged that upon assembly of the mask members into the body member the openings in said mask members are positioned to be displaced slightly inwardly towards the vertical center of the body member by an amount which is slightly greater than the inward displacement which the human eyes must accommodate when viewing close-up objects, whereby there is then insured the visual formation of a spatial window in front of the plane in which said film strips lie when said images are viewed by an observer.

10. The film mount of claim 1 including retaining means formed on said body member for assuring proper alignment thereof in a viewer.

* * * * *